(12) United States Patent
Nomura et al.

(10) Patent No.: US 7,882,362 B2
(45) Date of Patent: Feb. 1, 2011

(54) DATA MANAGEMENT APPARATUS

(75) Inventors: Yuu Nomura, Kobe (JP); Taku Yokawa, Kobe (JP); Yoshikazu Ueta, Kobe (JP); Mitsuhiro Maruo, Kobe (JP); Mitsuya Kawashita, Kobe (JP); Osamu Okada, Kobe (JP); Takeshi Ohhara, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 1110 days.

(21) Appl. No.: 11/583,075

(22) Filed: Oct. 19, 2006

(65) Prior Publication Data

US 2007/0106856 A1 May 10, 2007

(30) Foreign Application Priority Data

Nov. 7, 2005 (JP) .............................. 2005-322680

(51) Int. Cl.
*G06F 21/00* (2006.01)
(52) U.S. Cl. ........................... 713/185; 726/29; 726/31; 705/57
(58) Field of Classification Search ................ 380/203; 713/185; 705/57; 726/27, 29, 31
See application file for complete search history.

(56) References Cited

U.S. PATENT DOCUMENTS

| | | | |
|---|---|---|---|
| 6,263,313 B1 * | 7/2001 | Milsted et al. ................. | 705/50 |
| 7,350,238 B2 * | 3/2008 | Abe et al. ...................... | 726/29 |
| 7,505,955 B2 * | 3/2009 | Watanabe et al. .............. | 707/1 |

FOREIGN PATENT DOCUMENTS

| | | |
|---|---|---|
| JP | A 2001-118328 | 4/2001 |
| JP | A 2001-195509 | 7/2001 |
| JP | A 2002-190153 | 7/2002 |
| JP | A 2002-290884 | 10/2002 |
| JP | A-2002-311962 | 10/2002 |
| JP | A 2003-050746 | 2/2003 |
| JP | A-2003-59180 | 2/2003 |
| JP | A-2003-085048 | 3/2003 |
| JP | A-2003-166832 | 6/2003 |
| JP | A-2004-046431 | 2/2004 |

OTHER PUBLICATIONS

Feb. 2, 2010 Office Action issued in Japanese patent application No. 2005-322680 (with translation).
Japanese Office Action dated Nov. 9, 2010 for Japanese Application No. 2005-322680 (with translation).

* cited by examiner

*Primary Examiner*—Matthew B Smithers
*Assistant Examiner*—Paul Callahan
(74) *Attorney, Agent, or Firm*—Oliff & Berridge PLC

(57) ABSTRACT

In a data management apparatus (1) including a recording device (12) for recording contents data and a data processing section for processing the contents data, first management data for managing the contents data according to a first reference is recorded in the recording device (12), and the data processing section reproduces the contents data based on the first management data, and transfers the contents data to an external device (2) based on second management data which is used for management of the contents data by the external device according to a second reference different from the first reference. As a result, the protection of the contents data can be made while complying with related laws, and the contents data with optional functions added thereto can be backed up.

13 Claims, 11 Drawing Sheets

| ID | FileName | Album Name | Track No. | Musical Composition Name | Artist Name | Original Function 1 Compatible Data Name | Original Function 2 Compatible Data Name |
|---|---|---|---|---|---|---|---|
| 0 | f0 | a0 | t0 | st0 | at0 | OD10 | OD20 |
| 1 | f1 | a1 | t1 | st1 | at1 | OD11 | OD21 |
| 2 | f2 | a2 | t2 | st2 | at2 | OD12 | OD22 |
| 3 | f3 | a3 | t3 | st3 | at3 | OD13 Original Portion | OD23 |
| 4 | f4 | a4 | t4 | st4 | at4 | OD14 | OD24 |
| 5 | f5 | a5 | t5 | st5 | at5 | OD15 | OD25 |

Fig.6A  Original Management Data

Main Portion:

| ID | File Name | Album Name | Track No. | Musical Composition Name | Artist Name | Copyright Compatible Data 1 | Copyright Compatible Data 2 |
|---|---|---|---|---|---|---|---|
| 0 | f0 | a0 | t0 | st0 | at0 | CRD10 | CRD20 |
| 1 | f1 | a1 | t1 | st1 | at1 | CRD11 | CRD21 |
| 2 | f2 | a2 | t2 | st2 | at2 | CRD12 | CRD22 |
| 3 | f3 | a3 | t3 | st3 | at3 | CRD13 | CRD23 |
| 4 | f4 | a4 | t4 | st4 | at4 | CRD14 | CRD24 |
| 5 | f5 | a5 | t5 | st5 | at5 | CRD15 | CRD25 |

Attached Portion:

| ID | Original Function 1 Compatible Data Name | Original Function 2 Compatible Data Name |
|---|---|---|
| 0 | OD10 | OD20 |
| 1 | OD11 | OD21 |
| 2 | OD12 | OD22 |
| 3 | OD13 Original Portion | OD23 |
| 4 | OD14 | OD24 |
| 5 | OD15 | OD25 |

Fig.6B  Copyright Compatible Management Data

Main Portion

| ID | File Name | Album Name | Track No. | Musical Composition Name | Artist Name | Copyright Compatible Data 1 | Copyright Compatible Data 2 |
|----|-----------|------------|-----------|--------------------------|-------------|-----------------------------|-----------------------------|
| 0  | f0 | a0 | t0 | st0 | at0 | CRD10 | CRD20 |
| 1  | f1 | a1 | t1 | st1 | at1 | CRD11 | CRD21 |
| 2  | f2 | a2 | t2 | st2 | at2 | CRD12 | CRD22 |
| 3  | f3 | a3 | t3 | st3 | at3 | CRD13 | CRD23 |
| 4  | f4 | a4 | t4 | st4 | at4 | CRD14 | CRD24 |
| 5  | f5 | a5 | t5 | st5 | at5 | CRD15 | CRD25 |
| 6  | f6 | a6 | t6 | st6 | at6 | CRD16 | CRD26 |
| 7  | f7 | a7 | t7 | st7 | at7 | CRD17 | CRD27 |

(Copyright Compatible Data 2 column = Added Data)

Attached Portion

| ID | Original Function 1 Compatible Data Name | Original Function 2 Compatible Data Name |
|----|------------------------------------------|------------------------------------------|
| 0  | OD10 | OD20 |
| 1  | OD11 | OD21 |
| 2  | OD12 | OD22 |
| 3  | OD13 (Original Portion) | OD23 |
| 4  | OD14 | OD24 |
| 5  | OD15 | OD25 |

Fig.9A Copyright Compatible Management Data

| ID | FileName | Album Name | Track No. | Musical Composition Name | Artist Name | Original Function 1 Compatible Data Name | Original Function 2 Compatible Data Name |
|---|---|---|---|---|---|---|---|
| 0 | f0 | a0 | t0 | st0 | at0 | OD10 | OD20 |
| 1 | f1 | a1 | t1 | st1 | at1 | OD11 | OD21 |
| 2 | f2 | a2 | t2 | st2 | at2 | OD12 | OD22 |
| 3 | f3 | a3 | t3 | st3 | at3 | OD13 (Original Portion) | OD23 |
| 4 | f4 | a4 | t4 | st4 | at4 |  | OD24 |
| 5 | f5 | a5 | t5 | st5 | at5 | OD15 | OD25 |
| 6 | f6 | a6 | t6 | st6 | at6 |  |  |
| 7 | f7 | a7 | t7 | st7 | at7 |  |  |

Added Data

Fig.9B   Original Management Data

DATA MANAGEMENT APPARATUS

BACKGROUND OF THE INVENTION

1. Field of the Invention

The present invention relates to a backup system which serves to manage and reproduce contents data such as music data, etc., which has been recorded by a recording device, according to a specific management method, and at the same time back up the contents data into another recording device according to a predetermined method prescribed from the standpoint of copyright, etc.

2. Description of the Related Art

There has been proposed a music server which is equipped with a hard disk drive and records a lot of music data onto the hard disk drive. The hard disk drive has a fast access speed and a large capacity, so with a music server that can record music data on the hard disk drive, a lot of music data can be managed efficiently. However, there is a possibility that when digital data such as music data, etc., is recorded on the hard disk drive, such digital data may be copied illegally and the writer's or author's right will not be protected. Accordingly, it is considered that a SCMS (Serial Copy Management System) is adopted, for example, as a countermeasure to protect the copyrights against illegal copying. The SCMS limits copying or reproduction in such a manner that the copying or reproduction is permitted only once from one digital equipment to another one.

However, there is a possibility that digital data is reproduced illegally when the hard disk drive itself is exchanged even with the adoption of this SCMS. In view of this, there has been disclosed a technique that makes it possible to protect the digital data even if the hard disk drive is exchanged in such a manner (see, for example, Japanese patent application laid-open No. 2001-118328). In this technique, by using a parameter for the individual authentication of the hard disk drive and parameters for access to the files on the hard disk drive, the protection of the digital data is made possible.

In addition, there arises a problem that when a large amount of digital data is stored on the hard disk drive, the digital data recorded on the hard disk drive will disappear if the hard disk drive is put into trouble. Thus, there has been disclosed a technique that manages the digital data recorded on a hard disk drive in a safe manner within the range where the problem of copyright does not occur (see, for example, Japanese patent application laid-open No. 2002-190153). In this technique, digital data is recorded on the hard disk drive, and at the same time is also recorded on a rewritable optical disc as backup data.

Another technique related to the backup of contents data is disclosed in Japanese patent application laid-open No. 2001-195509.

SUMMARY OF THE INVENTION

When contents data such as a large amount of music data, etc., is recorded on a recording device and is then reproduced, various optional functions may sometimes be provided to the user so as to further enhance user's convenience and the utility value of the contents data. In other words, consideration is given to the fact that it is desired to manage contents data so that users can reproduce the contents data more easily.

However, such optional functions are originally set by the supplier of the recording device etc., and the standard thereof is often not general. On the other hand, there arises a necessity for backing up the contents data recorded in the recording device due to a failure thereof, etc., but in that case, it is necessary to carefully consider the copyright of the contents data and to comply with the related laws. Thus, in cases where the backup of contents data is done while protecting the copyright thereof, a general-purpose backup system is established from a request for the standardization of such a backup, but the backup of the contents data with the above-mentioned optional functions becomes difficult in such a general-purpose backup system, resulting in lack in the user's convenience.

In view of the above problems, the present invention is intended to protect contents data while complying with the related laws and at the same time to back up the contents data with optional functions attached thereto.

According to the present invention, in order to solve the above-mentioned problems, for management of contents data, two pieces of mutually related but different management data are formed in a data management apparatus that manages the contents data. By managing one piece of contents data with the two pieces of mutually related but different management data, i.e., by duplexing the management data, it is possible to make the contents data exhibit optional functions and at the same time to enable the contents data to be backed up while protecting the contents data with due consideration given to the optional functions.

Specifically, the present invention resides in a data management apparatus for managing contents data, which is provided with a recording device that records the contents data, and a data processing section that processes said contents data. Said recording device records therein first management data for managing said contents data according to a first reference, and said data processing section reproduces said contents data based on said first management data, and transfers said contents data to an external device based on second management data which is used for management of said contents data by said external device according to a second reference different from said first reference.

In the data management apparatus according to the present invention, the processing of contents data is performed by the data processing section. First of all, in said data management apparatus, reproduction of contents data is performed based on the first management data recorded in the recording device. This first management data and the second management data to be described later in detail are pieces of management data for managing the contents data, which are, for example, data associated with the attributes, etc., of the contents data such as an identification number given to each piece of the contents data, a file name that is possessed by each piece of the contents data, parameters related to their contents, and so on. In some cases, such management data are kinds of databases.

This first management data contains information on the contents data based on the first reference, and the data processing section reproduces the contents data based on this first management data. Thus, said first reference is a reference for attaching optional functions such as user's convenience upon reproduction of the contents data, etc., to the first management data. Accordingly, the first management data contains the data used for the management of the contents data compatible with said optional functions. As a result, when the contents data is reproduced by the data processing section, the user can enjoy the benefit of said optional functions.

Here, when the contents data is backed up to the external device outside the data management apparatus, i.e., when the management of the contents data is performed, the transfer of the contents data based on the first management data is not necessarily to protect the copyright of the contents data. This is because the first management data is management data for achieving a specific purpose upon reproduction such as attaching an optional function to said contents data. In addition, in order to protect the contents data, a method for the protection thereof is required to be versatile or generic, but with the management data including the optional function, it becomes difficult to protect the contents data according to a versatile method.

Accordingly, in the data management apparatus of the present invention, when the contents data is backed up, i.e., when the contents data is transferred to the external device, the transfer of the contents data is carried out based on the second management data that is different from the first management data. That is, the data management apparatus according to the present invention is featured in that double management according to the first management data and the second management data is performed with respect to one piece of contents data. Here, note that the second management data may be formed completely independently of the first management data. In the case of the second management data being formed independently of the first management data, the second management data is formed from some data related to the contents data based on the second reference (this second reference being clearly different from the first reference) that is used for the formation of management data required for data management from the standpoint of protection of the copyright of the contents data, etc. For example, the second management data is formed by adding management data specific to the second reference to basic data of the contents data. At this time, the first management data may also be formed by adding management data specific to the first reference to the basic data of the contents data.

On the other hand, the second management data may be formed from the first management data. That is, the first management data is converted into the second management data based on the second reference. For example, the second management data is formed from the first management data according to a conversion process based on the second reference such as by removing the data that is contained in the first management data so as to achieve a specific purpose upon reproduction from a main portion of the first management data, and at the same time, by incorporating, into the main management data, the data that is required for protection of the contents data, etc. In other words, those pieces of the management data which can be utilized in common in the first management data and in the second management data are continuously used, and data specific to the second management data is added posteriorly.

Also, by transferring the contents data to the external device based on the second management data, the data processing section can back up the contents data while ensuring the protection of the copyright, etc., of the contents data.

As described above, in the data management apparatus according to the present invention, the protection of the contents data can be made while complying with the related laws by reproducing the contents data based on the first management data and transferring the contents data based on the second management data different from the first management data, and at the same time, the contents data with an optional function attached thereto can be backed up.

Here, note that when the backup of the contents data is carried out by the data processing section, at least the second management data need only exist as management data. Accordingly, when said backup is carried out, the contents data may be transferred to the external device with the first management data being deleted from the data management apparatus together with the contents data.

In addition, in the data management apparatus as stated above, provision may be made for a management data forming section that forms said second management data from said first management data based on said second reference. That is, it is preferable that when a request for the backup of the contents data is made, the management data forming section form the second management data from the first management data immediately before the execution of said backup, and that the formation of the second management data is performed immediately before said data processing section transfers said contents data to said external device. Here, note that even when a request for the backup of the contents data has not yet been made, the formation of the second management data from the first management data in advance is not prevented.

Here, in the above-mentioned data management apparatus, said second management data may be composed of a main portion and an attached portion, wherein said main portion has a main management data for transfer of said contents data to said external device, and said attached portion has a data that does not constitute the main portion of said second management data, among said first management data, based on a difference between said second reference and said first reference, whereby said data processing section may transfer said contents data to said external device based on said main portion of said second management data.

Specifically, the second management data has a double structure including the main portion and the attached portion, and the backup of the contents data is performed based on those pieces of the management data which are contained in the main portion, and those pieces of data which are contained in the attached portion do not contribute to this backup. Those pieces of data contained in the attached portion are, stated in other words, a part of management data necessary for reproducing the contents data in the data management apparatus, but are not required for the backup of said contents data. That is, such data may be those portions of the management data which are related to the management of the contents data irrespective of said backup, such as those portions of the management data which serve the specific purpose upon the reproduction of said contents data. Such portions of management data, being contained in the attached portion, can be made use of, in the future, as data that is related to the reproduction of the contents data in the data management apparatus. For example, it is possible to restore the first management data from the second management data after this backup is done.

In addition, in the data management apparatus as stated above, said first management data may be recorded in an inaccessible region, among the recording area of said recording device, which said external device can not access, and said second management data and said contents data may be recorded in an accessible region, among the recording area of said recording device, which said external device can access.

The first management data is related to the reproduction of the contents data in the data management apparatus, so there is fear that when the first management data is accessed from the outside, adequate reproduction of the contents data might be obstructed. Thus, it is preferable that the first management data be recorded in the inaccessible region. On the other hand, the second management data is related to the backup of the contents data, and hence has to be accessible by the external device together with the contents data to be backed up. Accordingly, it is preferable that the second management data and the contents data be recorded in the accessible region.

Also, in the data management apparatus as stated above, it is preferable that said second management data be formed from said first management data based on said second reference, and/or said first management data be formed from said second management data based on said first reference. That is, both of the first and second management data manage the same contents data based on the first and second references mutually different from each other, so those portions of management data which are related to attributes or the like of the contents data can be partially common. Accordingly, by making both of the first and second management data have compatibility with each other, it is possible to easily perform data management compatible with either the first reference or the second reference with respect to the contents data.

Further, provision may be made for a determination section that determines whether said first management data or said second management data is in a normal state, and a restoration section that restores abnormal management data from normal management data when said determination section makes a determination that either said first management data or said second management data is not in a normal state.

Specifically, when a management data either of the first management data or the second management data is damaged by user's wrong operation or the like, the restoration section restores the damaged data from non-damaged data by making use of the compatibility between the first management data and the second management data. Here, note that the determination section may determine whether both of the first and second management data are normal, based on the result of automatically checking the data structure of the management data or based on a management data restoration request from the user.

Moreover, in the data management apparatus as stated above, provision may be further made for a management data forming section that forms said second management data from said first management data based on said second reference, and records it in said recording device before said data processing section transfers said contents data to said external device. That is, when a request for the backup of the contents data is made, the management data forming section forms the second management data from the first management data immediately before the execution of said backup. Here, note that even when a request for the backup of the contents data has not yet been made, the second management data may be formed from the first management data in advance.

Here, the present invention can be seen from the aspect of a program that makes a data management apparatus execute predetermined steps, the data management apparatus being provided with a recording device that records contents data and first management data for managing said contents data according to a first reference, and a reproduction section that reproduces said contents data based on said first management data. That is, the present invention resides in a data management program that makes said data management apparatus execute a step of forming second management data based on a second reference different from said first reference, and a step of transferring said contents data recorded in said recording device to said external device based on said second management data.

Here, the second management data may be formed from the first management data, as stated above, or may be made independent from the first management data in the process of formation of the second management data. That is, as a result, double data management is performed according to the first management data and the second management data. By executing the data management program, the data management apparatus can protect the contents data while complying with the related laws, and at the same time can back up the contents data with an optional function attached thereto by reproducing the contents data based on the first management data and transferring the contents data based on the second management data.

In addition, in the above-mentioned data management program, said data management apparatus may be made to further execute a step of forming said second management data from said first management data based on said second reference, and/or forming said first management data from said second management data based on said first reference. That is, as stated above, by providing compatibility between the first management data and the second management data, it is possible to easily perform data management compatible with either the first reference or the second reference with respect to the contents data.

Here, the present invention can also be seen from the aspect of a method for managing contents data in a data management apparatus which is provided with a recording device that records said contents data and first management data for managing said contents data according to a first reference, and a reproduction section that reproduces said contents data based on said first management data. That is, the present invention resides in a data management method for managing said contents data, said method comprising a step of forming second management data based on a second reference different from said first reference, and a step of transferring said contents data recorded in said recording device to said external device based on said second management data.

Here, as referred to above, the second management data may be formed from the first management data, or may be made independent from the first management data in the process of formation of the second management data. That is, as a result, double data management is performed according to the first management data and the second management data. With such a data management method, the data management apparatus can protect the contents data while complying with the related laws, and at the same time can back up the contents data with an optional function attached thereto by reproducing the contents data based on the first management data and transferring the contents data based on the second management data.

In addition, said data management method may further comprise a step of forming said second management data from said first management data based on said second reference, and/or forming said first management data from said second management data based on said first reference. That is, as stated above, by providing compatibility between the first management data and the second management data, it is possible to easily perform data management compatible with either the first reference or the second reference with respect to the contents data.

Further, the present invention can be seen from the aspect of a data management system for managing contents data. That is, the present invention resides in a data management system which is provided with a first data management device that has a first recording device for recording contents data and a first processing section for processing said contents data based on a first management data, and a second data management device that is capable of communicating with said first data management device, and has a second recording device that can record predetermined data, and a second processing section for processing said contents data based on second management data. Said first management data is data for managing said contents data according to a first reference, and said second management data is data for managing said contents data based on a second reference different from said first reference. Said first processing section reproduces said contents data based on said first management data in said first data management device, and said second processing section transfers said contents data to said second recording device based on said second management data.

Here, as stated above, the second management data may be formed from the first management data, or may be made independent from the first management data in the process of formation of the second management data. That is, as a result, double data management is performed according to the first management data and the second management data. In such a data management system, it is possible to protect the contents data while complying with the related laws, and at the same time to back up the contents data with an optional function attached thereto by the reproduction of the contents data based on the first management data by means of the first processing section and by the backup of the contents data into the second recording device based on the second management data by means of the second processing section, i.e., the transfer of the contents data.

Here, when the second management data is also backed up to the second recording device upon the backup of the contents data, said second processing section may reproduce the contents data transferred to said second recording device in said second data management device based on said second management data transferred to said second recording device. As a result, the contents data can be reproduced in the second data management device, too, but this reproduction is different from the reproduction of the contents data by the first processing section in the first data management device. That is, since management data used for reproduction of the contents data is the transferred second management data, it is difficult to perform reproduction with an optional function in consideration of user's convenience, etc., as in the reproduction of the contents data based on the first management data. Here, note that in case where the second management data contains data of a certain optional function for the reproduction of the contents data in a form that does not influence general backup, it is possible to reproduce the contents data according to such an optional function.

Also, in the above-mentioned data management system, said first management data may be recorded in an inaccessible region, among the recording area of said first recording device, which said second data management device can not access, and said second management data and said contents data may be recorded in an accessible region, among the recording area of said first recording device, which said second data management device can access. As stated above, this is due to a difference in the characteristics of access from the second data management device to the first management data and the second management data.

In addition, the above-mentioned first data management device may be further provided with a determination section that determines whether said second management data is in a normal state, and a restoration section that restores new second management data from said first management data based on said second reference when said determination section makes a determination that said second management data is not in a normal state.

Since said second management data is recorded in the accessible region which the second data management device of the first recording device can access, as stated above, there is a possibility that said second management data might be damaged by user's wrong operation or the like. Thus, when said determination section makes a determination that said second management data is damaged and not in a normal state, the restoration section restores new second management data from said first management data based on said second reference. Here, note that the determination section may determine whether the second management data is in a normal state, based on the result of automatically checking the data structure of the second management data or based on a second management data restoration request from the user.

Here, in the data management system as stated above, provision may be further made for a management data forming section that forms said second management data from said first management data based on said second reference, and records it in said first recording device immediately before said second processing section transfers said contents data to said second recording device. That is, when a request for the backup of the contents data is made, the management data forming section forms the second management data from the first management data immediately before the execution of said backup. Here, note that even when a request for the backup of the contents data has not yet been made, the formation of the second management data from the first management data in advance is not prevented.

Moreover, instead of the above, provision may be further made for a management data forming section that forms said second management data from said first management data based on said second reference, and records it in said first recording device when said second data management device communicates with said first data management device. That is, the second management data may be formed from the first management data in the process of communication between the second data management device and the first data management device.

Here, when the second management data is also backed up to the second recording device upon the backup of the contents data, said second processing section in the data management system as stated above may further update the contents data recorded in said second recording device, and also may update said second management data recorded in said second recording device in accordance with the update of said contents data therein. That is, in the second data management device to which the contents data has been backed up, the content of the contents data is freshly updated, i.e., partially added, deleted or the like, and the content of the update is reflected on the second management data in the second data management device. As a result, data management such as reproduction of the updated contents data or the like can be done in the second data management device.

Here, when the second management data is formed from the first management data based on the second reference, said second processing section in the data management system as stated above may transfer only those portions of said contents data which are managed in duplicate by said second management data and said first management data to the second recording device. In the process of formation of the second management data, a part of the first management data might not be reflected on the second management data due to a difference between the first reference and the second reference. In such a case, only a part of the contents data compatible with the first management data reflected on the second management data is backed up to the second data management device.

In addition, in the data management system as stated above, said second management data may be composed of a main portion and an attached portion, wherein said main portion has a main management data for transfer of said contents data to the second data management device of an external device, and said attached portion has a data that does not constitute said second management data, among said first management data, based on the difference between said second reference and said first reference, whereby said second processing section may transfer said contents data to said second recording device based on said main portion of said second management data. As stated above, the second management data is formed into a double structure including the main portion and the attached portion, whereby future use can be made of the portions of management data, which are contained in the attached portion and are related to the optional reproduction of the contents data, etc., in the first data management device.

Further, in case where the second management data is also backed up to the second recording device upon the backup of the contents data, and in case where the above-mentioned data management system is further provided with a third data management device comprising a third recording device that can communicate with said second data management device and can record predetermined data, and a third processing section that processes said contents data recorded in said second recording device according to third management data, said third processing section may form said third management data in said third recording device from said main portion and said attached portion of said second management data recorded in said second recording device based on said first reference, and may transfer said contents data recorded in said second recording device to said third recording device based on said third management data.

The third data management device forms the third management data according to the first reference from the second management data, similar to the first data management device. In other words, the third data management device reproduces management data, which is the third management data and is of substantially the same quality as the first management data, from the second management data that is possessed by the second data management device. As a result, the contents data can be backed up to the third data management device from the first data management device in which the management of the contents data can be done based on the first management data (the third management data) according to the same first reference, through the second data management device. In this case, the management of the contents data according to the second reference is performed by way of the second data management device, whereby the contents data is backed up from the first data management device to the third data management device while protecting the copyright and the like of said contents data in a reliable manner. When the update of hardware is carried out, e.g., when the first data management device is updated to the third data management device, which is a new data management device, by such transfer of the contents data, or when the contents data, having been backed up in advance for the damage of the first data management device, is reflected on the third data management device in the form of a new data management device, the contents data can be transferred while complying with the related laws.

Furthermore, when the contents data is updated in the second data management device, as stated above, the updated content can be reflected on the third data management device, too.

It is to be noted that the transfer of the contents data in the present invention as stated above includes the cases of leaving and not leaving the contents data in the transfer source (i.e., original locations) after said contents data has been transferred. That is, in case where it is undesirable to leave the contents data in the transfer source based on the requirements of the laws of copyrights, etc., e.g., where the above-mentioned update of hardware is updated, it is desirable to transfer said contents data in the form of movement thereof. On the other hand, in case where the contents data is allowed to be left in the transfer source, e.g., where a personal backup against the above-mentioned future unexpected data damage is done, it is desirable to transfer said contents data in the form of copying thereof.

From the foregoing description, it will be understood that according to the present invention, the protection of contents data can be made while complying with the related laws, and contents data with an optional function attached thereto can be backed up.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIGS. 6A and 6B are views showing the data structure of management data for music data used in a vehicle-mounted terminal, and the data structure of management data for the music data used in an external personal computer, respectively, when the music data is backed up from the vehicle-mounted terminal to the external personal computer in the data management system according to the embodiment of the present invention.

FIGS. 9A and 9B are views showing the data structure of management data of music data used in an external personal computer and the data structure of management data of the music data used in a vehicle-mounted terminal, respectively, when the music data is moved and copied from the external personal computer to the vehicle-mounted terminal in the data management system according to the embodiment of the present invention.

DESCRIPTION OF THE PREFERRED EMBODIMENTS

Hereinafter, preferred embodiments of a data management apparatus, a data management method and a data management system according to the present invention will be described in detail based on the accompanying drawings.

First Embodiment

Figure 1:
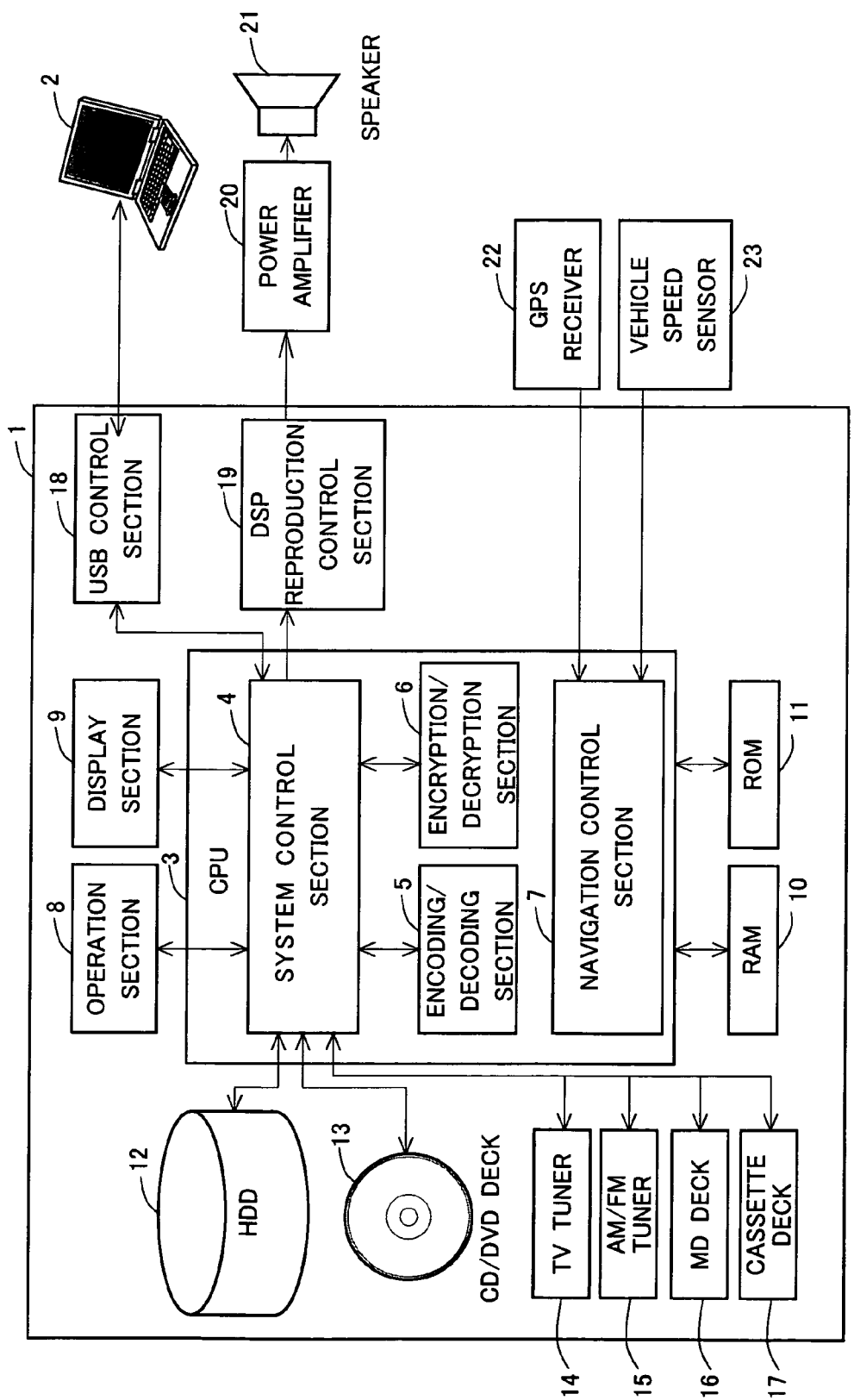
FIG. 1 is a schematic view of a data management apparatus in the form of a vehicle-mounted terminal and a data management system that is constructed to include the vehicle-mounted terminal according to an embodiment of the present invention.

FIG. 1 is a view that shows the outline of a data management system comprising a vehicle-mounted terminal 1 that functions as a data management device according to the present invention and is installed on a vehicle, and an external personal computer 2 that is connected through communications to the vehicle-mounted terminal 1. The vehicle-mounted terminal 1 has a central processing unit (hereinafter referred to as a "CPU") 3. This CPU 3 includes two control sections comprising a system control section 4 and a navigation control section 7 arranged in the interior thereof. In addition, the external personal computer 2 has a recording device capable of recording data in its interior.

The system control section 4 is to control the vehicle-mounted terminal 1 so as to make it function as a data management device. This vehicle-mounted terminal 1 has a function to reproduce so-called music data in the vehicle as contents data. The management of the music data will be described below in detail. The vehicle-mounted terminal 1 is provided with a CD/DVD deck (hereinafter referred to simply as a "CD deck") 13 and a hard disk drive (hereinafter referred to as a "HDD") 12, which are respectively electrically connected to the system control section 4. Also, electrically connected to the system control section 4 are an operation section 8 that accepts a command for the management of music data from a user who controls the vehicle, and a display section 9 that shows information on the music data to the user. Further, electrically connected to the system control section 4 is a DSP reproduction control section 19, which performs calculation processing on the music data sent thereto from the system control section 4 and sends an electric signal for music performance to a power amplifier 20 which is arranged outside the vehicle-mounted terminal 1.

In addition, specific reference will be made to the management of music data in the vehicle-mounted terminal 1. When the user controlling the vehicle puts a music CD with music data recorded thereon into the CD deck 13, music data is sampled from the music CD by the system control section 4. and is sent to a DSP reproduction control section 19 where it is processed so as to play music from a speaker 21 arranged in the vehicle through the power amplifier 20. At this time, when the music CD put into the CD deck 13 is first played or performed in the vehicle, the system control section 4 converts the music data into a predetermined file format such as ATRAC3, MP3, etc., and is recorded onto the HDD 12. By doing so, the system control section 4 records the music data on the HDD 12, so that even if the music CD is not inserted into the CD deck 13, the user can arbitrarily reproduce the music data recorded in the HDD 12, and listen to the music thus reproduced in the vehicle.

Here, note that when a music CD having a history previously recorded on the HDD 12 by the system control section 4 is inserted into the CD deck 13 again, the system control section 4 does not record the music data of the music CD into the HDD 12. Also, in addition to the automatic recording of music data into the HDD 12 by means of the system control section 4, as stated above, only arbitrary pieces of the music data of the music CD may be recorded into the HDD 12 according to a command from the user through the operation section 8.

Further, in the CPU 3, the system control section 4 is electrically connected to an encoding/decoding section 5 and an encryption/decryption section 6. In the encoding/decoding section 5, the compression of music data upon recording of the music data on the HDD 12 and the decompression of the thus compressed music data for calculation processing in the DSP reproduction control section 19 are performed. Also, in the encryption/decryption section 6, the encryption and decryption for protecting the copyright of the music data recorded on the HDD 12 are performed. Such a technique for the copyright protection will be described later.

In addition, the vehicle-mounted terminal 1 is provided with a TV tuner 14, an AM/FM tuner 15, a MD deck 16 and a cassette deck 17, all of which are respectively electrically connected to the system control section 4. By selecting either of these elements, the user can reproduce music data from individual mediums such as a TV, a radio, an MD and a cassette tape in the vehicle. In addition, the music data obtained from the individual mediums can be recorded on the HDD 12 as in the case of the music CD, as stated above.

Next, the navigation control section 7 is to perform car navigation in the vehicle on which the vehicle-mounted terminal 1 is installed, but in this particular embodiment of the present invention, the navigation control section 7 does not accomplish a key or major function, so a detailed description thereof is omitted here, and the description thereof in the accompanying drawings is limited to a minimum. The vehicle is provided with a GPS (Global Positioning System) receiver 22 for navigation and a vehicle speed sensor 23 for detecting the speed of the vehicle, these elements being respectively electrically connected to the navigation control section 7. The navigation control section 7 performs navigation of the vehicle based on signals from the vehicle speed sensor 23 and the GPS receiver 22, and map data recorded on the HDD 12.

The CPU 3 is electrically connected to a RAM 10 and a ROM 11, too, so that it can access the information stored in these memories as required. In addition, the system control section 4 is electrically connected to a USB (Universal Serial Bus) control section 18, whereby the vehicle-mounted terminal 1 becomes possible to communicate with the external personal computer 2 with the USB mass storage class specification.

Figure 2:
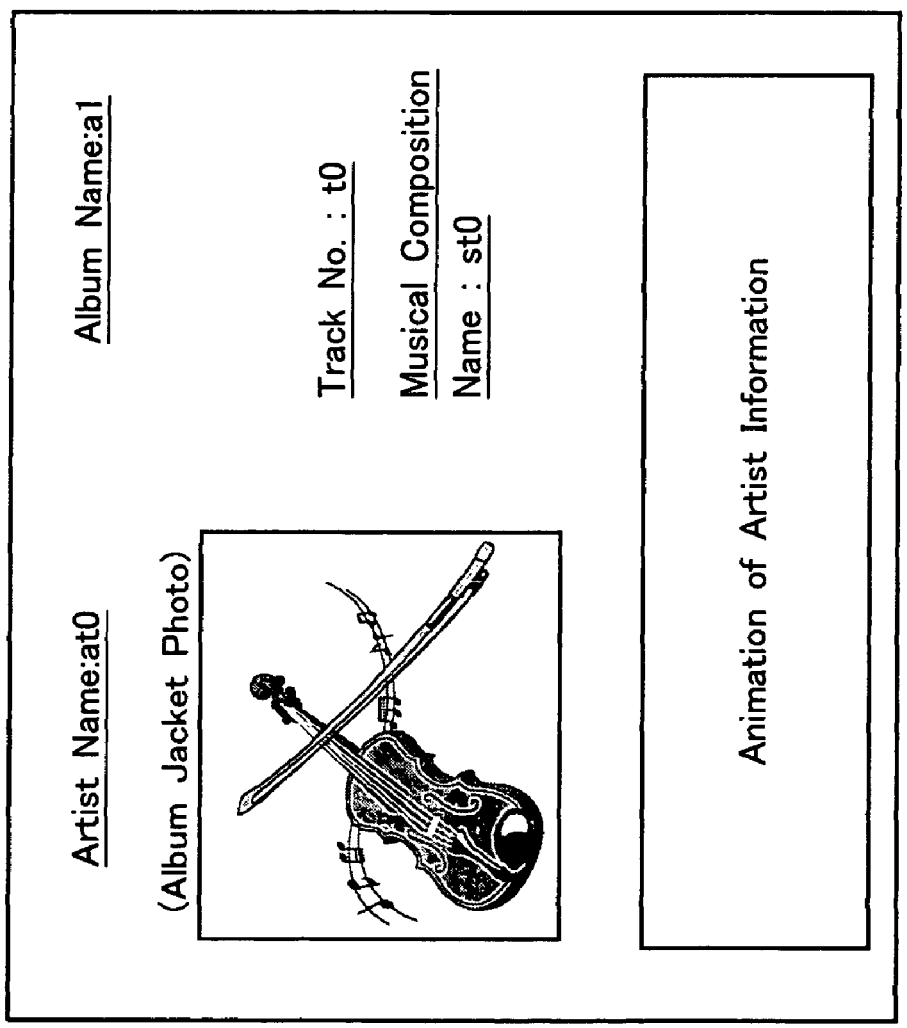
FIG. 2 is a view showing a display screen in a display section of the vehicle-mounted terminal according to the embodiment of the present invention.

Here, specific reference will be made to the reproduction of the music data recorded on the HDD 12 in the vehicle-mounted terminal 1. When the system control section 4 accesses the HDD 12 and the music data recorded thereon, the access is based on management data for management of a large amount of music data. The details of the management data will be described later. Based on parameters of the music data obtained from the management data, the system control section 4 forms a reproduction screen at the time of reproduction of the music data in the display section 9 (see FIG. 2). In this embodiment, as illustrated in FIG. 2, in the display section 9, a screen is shown on which there are displayed an artist name and an album name in the music data, a track number and a musical composition name in the album of the musical composition in combination with a jacket photograph of the album of the musical composition and an animation of the information on the artist. As a result, the user can easily grasp the information on the musical composition in a visual manner while listening to the musical composition.

Figure 3:
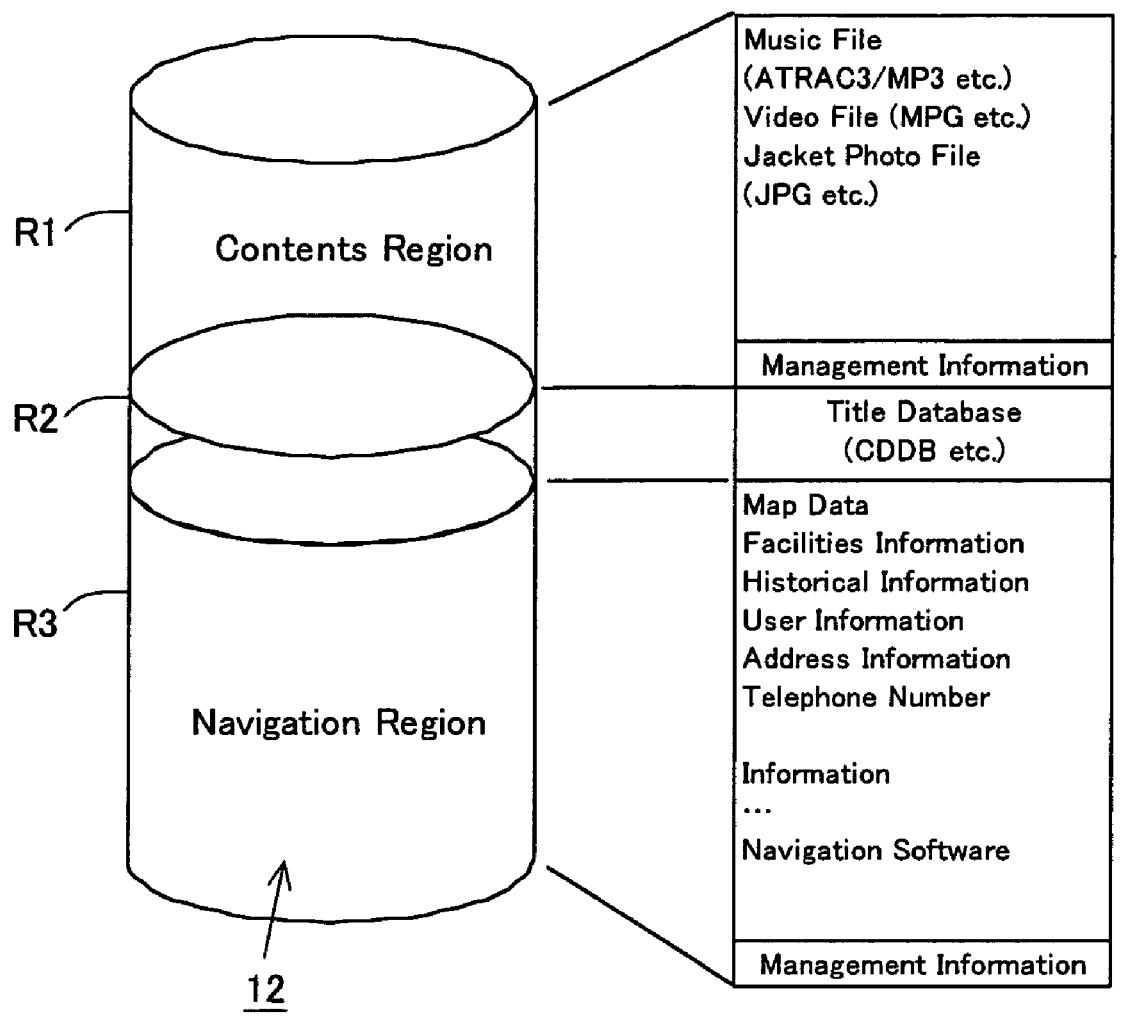
FIG. 3 is a view showing the data organization of a recording device in the form of a hard disk drive of the vehicle-mounted terminal according to the embodiment of the present invention.

In order to perform the management of such music data, a data structure illustrated in FIG. 3 is constructed in the HDD 12. The HDD 12 has a storage area which is mainly divided or classified into three regions R1, R2 and R3. The region R1 is a region where contents data such as the above-mentioned music data, etc., are recorded. Specifically, in the region R1, there are recorded files of the music data converted into predetermined file formats such as ATRAC3, MP3, etc., by the system control section 4, as stated above, image files for the jacket photograph of the above-mentioned album (called "jacket photo file" in FIG. 2), and video files of the animation of the information on the above-mentioned artist. In addition, management data flies concerning the management information for managing the contents data are also recorded in the region R1.

Next, in the region R2, there is recorded a title database in which the album names and the musical composition names of the music CD inserted into the CD deck 13 are made into a database such as, for example, "CDDB" (a registered trademark). Further, in the region R3, there are recorded the data, etc., used for car navigation by the navigation control section 7. For example, map data, information of facilities on the map, navigation historical information, user information, address information, telephone number information, application software, etc., for performing navigation itself, and management data concerning the management information for managing these pieces of data are recorded in the region R3.

Figure 4:
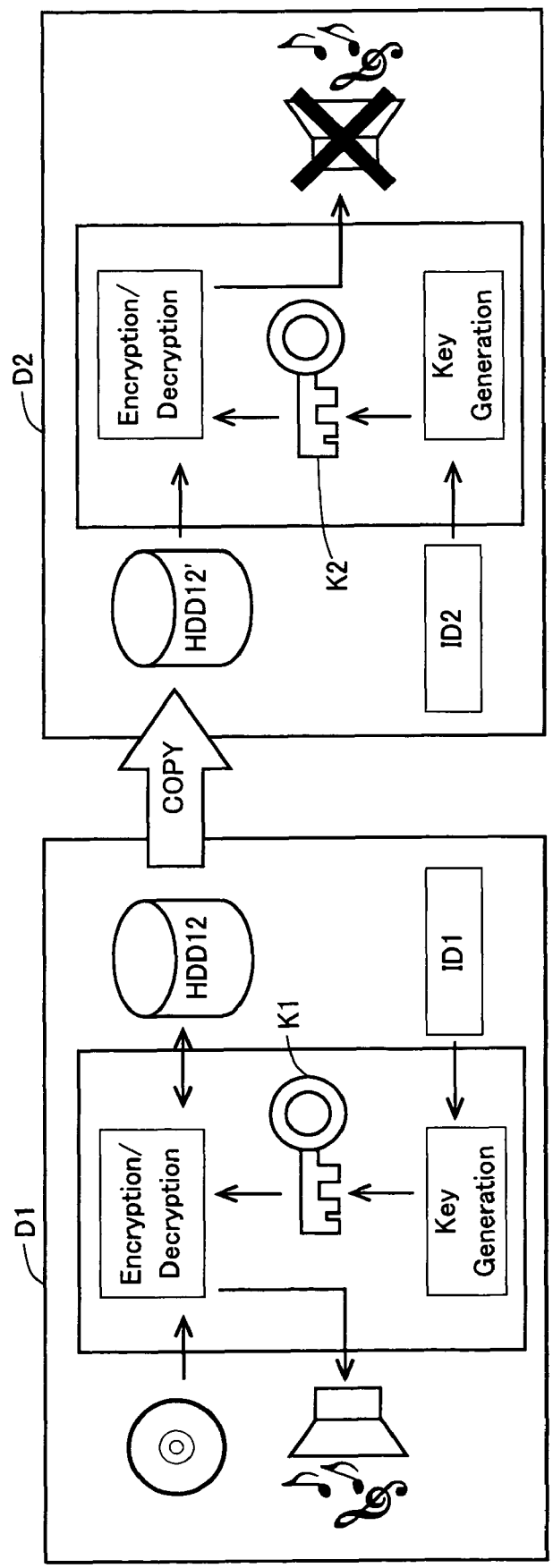
FIG. 4 is a view showing a technique for protecting the copyright of music data in a simple manner.

Here, the music data recorded from the music CD onto the HDD 12 is digital data, and hence the copyright thereof should be protected to a satisfactory extent. If the music data is uselessly or unduly backed up, i.e., copied or moved, to another recording device from the HDD 12, there will be a high probability of violation of the copyright of the music data. Accordingly, a copyright protection technique, as illustrated in FIG. 4, is used for example.

Such a copyright protection technique will be described below based on FIG. 4. When data is recorded from a music CD to the HDD 12 in a data management device D1, the encryption of the data is performed based on prescribed rules, and the thus encrypted music data can not be decrypted if a corresponding key K1 for decryption does not exist. Here, an identification number ID1 is given to the data management device D1 beforehand, and the key K1 is generated from this identification number ID1. Accordingly, the music data encrypted and recorded on the HDD 12 can be decrypted and reproduced in the data management device D1.

Here, let us assume that the encrypted music data recorded on the HDD 12 is copied to an HDD 12' of another data management device D2. However, an identification number ID2 different from that of the data management device D1 is given to this data management device D2, so a decryption key formed based on this identification number ID2 becomes not K1 but K2. Therefore, the decryption key for the music data copied to the HDD 12' is not a right or authorized key, so it becomes impossible to decrypt the encrypted music data, as a result of which the reproduction of the music data in the data management device D2 becomes impossible. Thus, the protection of the music data recorded on the HDD 12 can be made.

However, it is necessary to back up the music data for the purpose of personal use within the range of not violating the copyright of the music data. For example, the user occasionally wants to perform the backup of the music data recorded on the HDD 12 for protection thereof from the failure of the HDD 12 or the like. Even in such a case, useless or inordinate inhibition of the movement or copying of the music data results in the abuse of copyright, and there is a possibility of violating user's right or proper benefit. On the other hand, the copyright of the music data should be protected in a reliable manner.

Here, in a backup technique for protecting copyrights, it is required that the standard thereof be unified and generalized so as to widely spread the backup technique. Therefore, upon backing up, it becomes difficult to back up the data of a construction out of the standard under the protection of copyright. In particular, in the vehicle-mounted terminal 1, original functions such as the image display of the album of the music data, the graphic display of animation in the display section 9, etc., are executed, as stated above. In such a case, it is inconvenient to the user that the backup becomes impossible under the protection of copyright due to the existence of the original functions. Thus, a technique of backing up the music data including the original functions under the protection of copyright meets user's conveniences.

Figure 5:
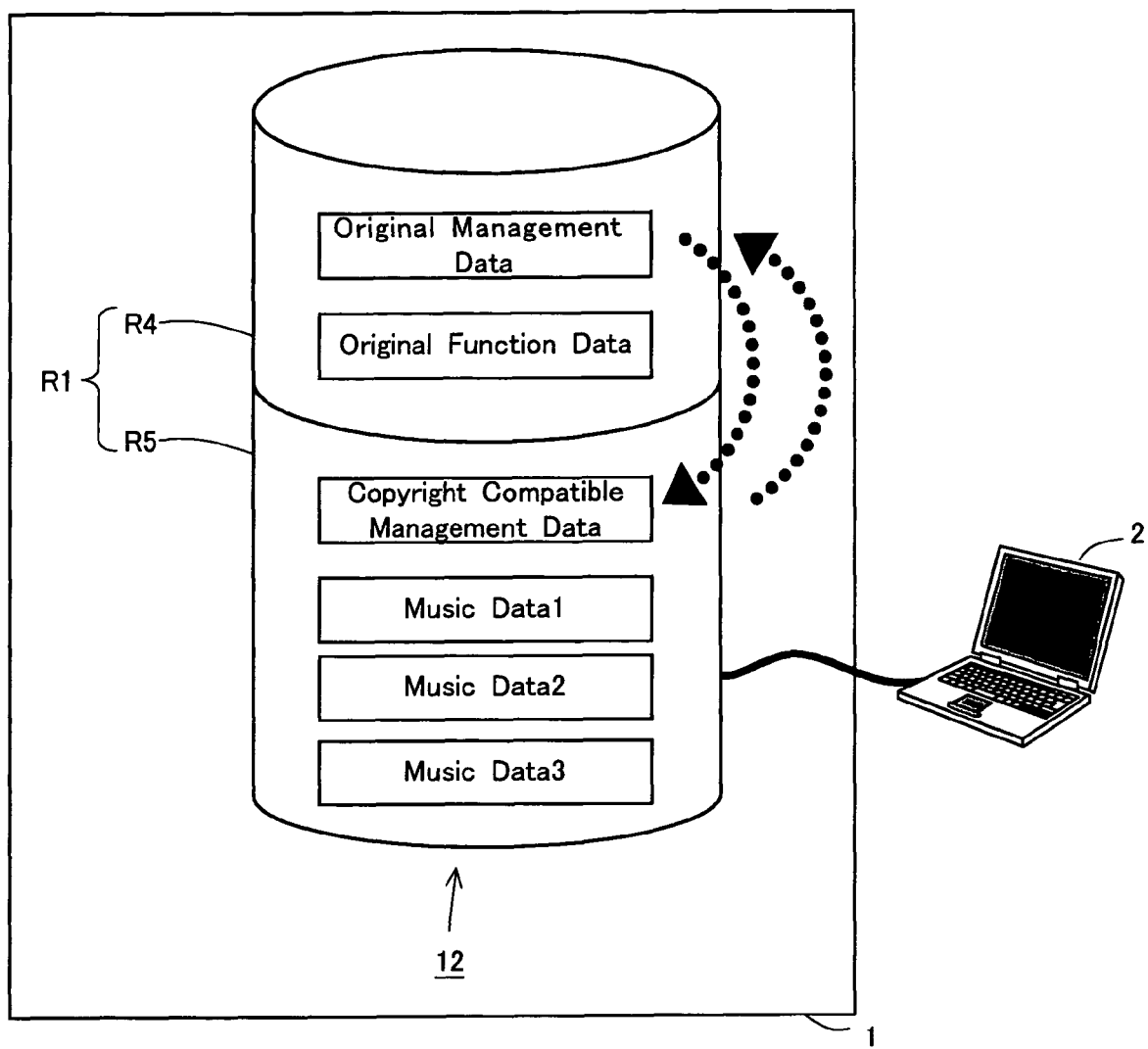
FIG. 5 is a view showing, in more detail, the data organization of the hard disk drive of the vehicle-mounted terminal according to the embodiment of the present invention.

Accordingly, the technique of backing up the music data including the above-mentioned original functions will be described below. The details of the data structure in the HDD 12 are shown in FIG. 5. Here, note that the HDD 12 shown in FIG. 5 is only the region R1. In addition, the connection between the HDD 12 of the vehicle-mounted terminal 1 and the external personal computer 2 is originally made through the system control section 4, the USB control section 18, etc., as shown in FIG. 1, but in FIG. 5, the description of these sections is omitted.

The region R1 of the HDD 12 according to the present invention is further divided into two regions R4 and R5. The region R4 is inaccessible from the external personal computer 2, whereas the region R5 is accessible from the external personal computer 2. First, in the region R4, there are recorded original management data that is management data for the music data including original functions to be executed by the vehicle-mounted terminal 1, and original function data (the above-mentioned jacket photo file and animation video file, as shown in FIG. 3) related to the original functions. On the other hand, in the region R5, there are recorded copyright compatible management data that is management data for backing up music data including original functions of the vehicle-mounted terminal 1 under the protection of copyright, and a lot of music data.

Here, the copyright compatible management data is formed from the original management data by the CPU 3. The management data will be described below in detail based on FIGS. 6A and 6B. FIG. 6A shows the structure of the original management data, and FIG. 6B shows the structure of the copyright compatible management data. The original management data has a data base structure which includes the jacket photo file names as a first original function and the above-mentioned animation video file names as a second original function in fields, in addition to the identification numbers (ID) of the music data recorded in the region R5, the file names of the music data, the album names that the music data belong, the track numbers of the music data in the albums, the names of musical compositions of the music data, and the names of the artists that perform the music data.

The vehicle-mounted terminal 1 performs the management of the music data recorded in the region R5 based on the original management data. That is, parameters for individual pieces of the music data, respectively, stored in the original management data are used to form a screen in the display section 9, as shown in FIG. 2, and the music data corresponding to the screen is reproduced through the DSP reproduction control section 19. In addition, the screen to be formed in the display section 9 and the music data to be sent to the DSP reproduction control section 19 are managed according to commands that are given by the user through the operation section 8. Accordingly, the original management data is to reproduce and manage the music data according to a reference "The original functions in the vehicle-mounted terminal 1 are made to exhibit". In this connection, note that in the following, this reference is referred to as a "first reference".

Then, the copyright compatible management data is composed of a main portion and an attached portion. The main portion is substantially used for the management of the music data, whereas the attached portion is not used for the management of the music data. Accordingly, the attached portion corresponds to a so-called header or the like of the copyright compatible management data. The structure of the main portion is the same as that of a part of the above-mentioned original management data. That is, the main portion has the fields of identification numbers (ID) of the music data, the file names of the music data, the names of albums to which the music data belong, the track numbers of the music data in the albums, the names of musical compositions of the music data, and the names of artists that perform the music data. Additionally, the copyright compatible management data has two fields including copyright compatible data 1 and copyright compatible data 2 given to each piece of the music data for the protection of the copyright of the music data. These copyright compatible fields correspond to a general standard for the movement, copying, reproduction after copying, etc., of the music data, and the data structure of the entire main portion is a generic data structure that can comply with the general standard for copyright protection.

In addition, the attached portion of the copyright compatible management data is composed of those which are contained in the original management data but not contained in the above-mentioned main portion, i.e., management data necessary for exhibiting the original functions in the vehicle-mounted terminal 1. The attached portion is an ancillary or appendant portion that is not used for the management of the music data, in particular for the management of the music data compatible with the general standard for copyright protection. Therefore, the copyright compatible management data is management data for managing the music data according to a reference "to conform to the general standard for the copyright protection of the music data". Here, note that in the following, this reference is referred to as a "second reference".

The copyright compatible management data is formed from the original management data by the CPU 3 in the vehicle-mounted terminal 1. That is, a part of the management data for the music data is duplicate in the original management data and the copyright compatible management data. This is data in a field substantially corresponding to the "music" itself in the music data. Accordingly, the CPU 3 adds the data in necessary fields to the data in the duplicate fields of the original management data according to the general standard for copyright protection, and stores into the attached portion those pieces of the original management data which are not involved in the general copyright protection, whereby copyright management data is formed from the original management data. That is, the CPU 3 converts, based on the second reference, the data structure of the management data that has been formed based on the first reference, thereby to form new management data.

In this respect, note that the formation of the second management data is not limited to such data conversion from the first management data as referred to above. For example, the second management data may be formed based on the second reference completely independently of the first management data in advance. Also, the first management data and the second management data are both related to the music data, and hence might have some pieces of data partially common in their internal structure. Accordingly, the first management data and the second management data may be formed from a base of such common pieces of data based on the first reference and the second reference respectively.

Here, the copyright compatible management data is not used for directly managing (reproducing) the music data in the vehicle-mounted terminal 1, but used for the management of the music data when the music data is moved or copied (backed up) from the vehicle-mounted terminal 1 to the external personal computer 2, i.e., under the condition that consideration should be given to the protection of the copyright of the music data. The backup of the music data is carried out as follows. That is, a backup application software installed on the external personal computer 2 accesses the copyright compatible management data recorded in the region R5 of the HDD 12 through the USB control section 18 of the vehicle-mounted terminal 1, and backs up the music data recorded in the region R5 to the recording device in the external personal computer 2 in accordance with the general standard for copyright protection. At this time, the copyright compatible management data is also backed up into the external personal computer 2.

As a result, the music data is backed up to the external personal computer 2 with the copyright of the music data being protected, and at the same time, those pieces of management data corresponding to the original functions in the vehicle-mounted terminal 1 is also backed up to the external personal computer 2. Accordingly, a music data reproduction application installed on the external personal computer 2, if compatible with the original functions, can reproduce the music data backed up under the copyright protection while exhibiting the original functions based on the data recorded in the attached portion of the copyright compatible management data. In addition, even if the music data reproduction application installed on the external personal computer 2 is not compatible with the original functions, the music data can be reproduced based on the data recorded in the main portion of the copyright compatible management data. Here, not that in order to make the external personal computer 2 exert the above-mentioned original functions, the vehicle-mounted terminal 1 cooperates with an application on the external personal computer 2 to transfer the original function data recorded in the region R4 to the external personal computer 2 at the time of backing up the music data.

Also, the external personal computer 2 may be connected to the vehicle-mounted terminal 1, so that the copyright compatible management data is formed after a request for transfer of music data from the external personal computer 2 is made or after a command for transfer of music data from the vehicle-mounted terminal 1 to the external personal computer 2 is made. That is, the backup of the music data is performed in accordance with the latest state of the music data that is recorded in the vehicle-mounted terminal 1 at the time immediately before the backup of the music data. Instead of this, the copyright compatible management data may be formed during the time when the external personal computer 2 is in some kind of communications with the vehicle-mounted terminal 1 or before the external personal computer 2 is connected to the vehicle-mounted terminal 1.

After the termination of the backup of the music data, the copyright compatible management data may be deleted from the vehicle-mounted terminal 1. This is because the copyright compatible management data is not directly used for the management of the music data in the vehicle-mounted terminal 1. In that case, new copyright compatible management data is formed upon the next backup of music data.

Figure 7:
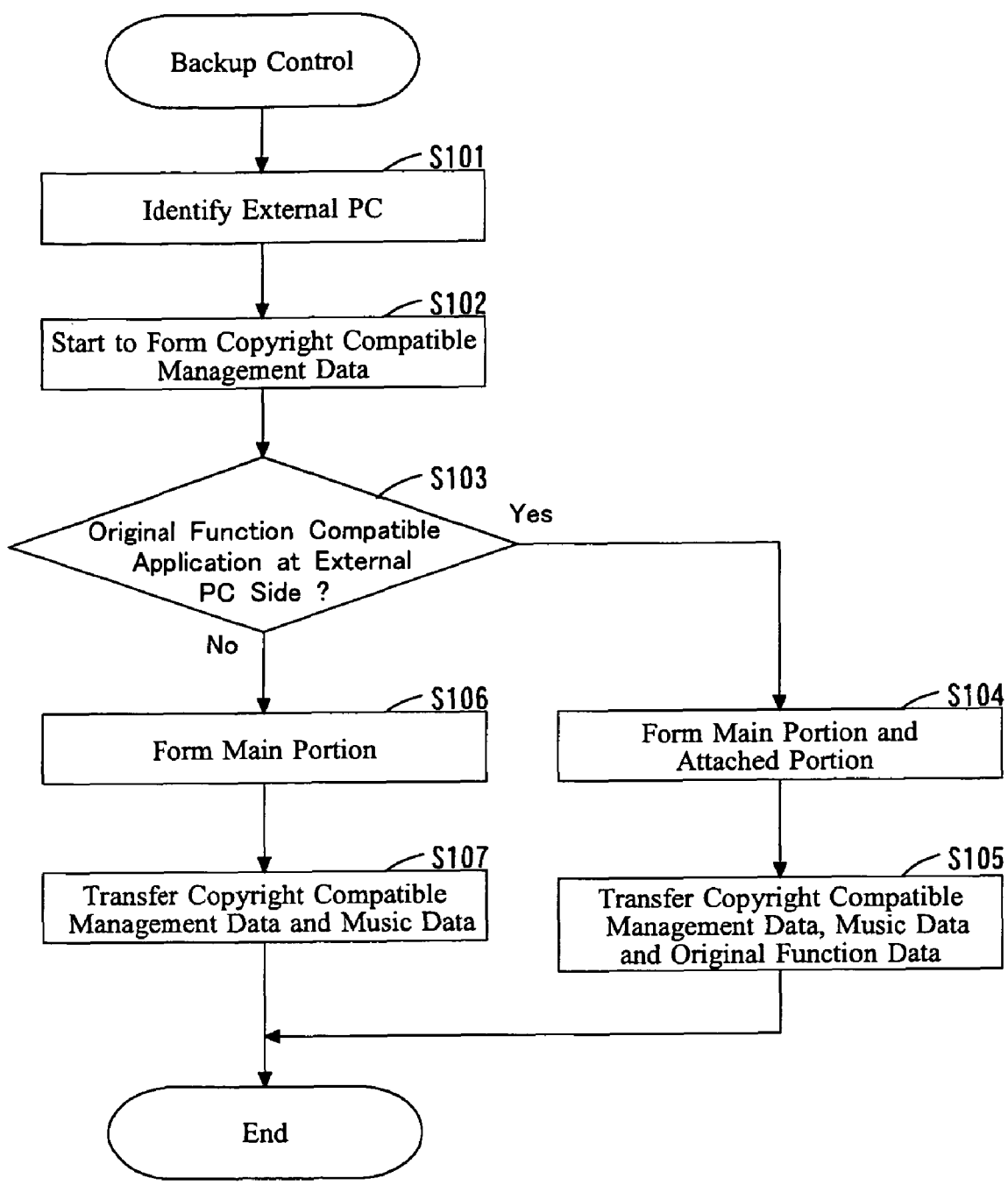
FIG. 7 is a flow chart showing the flow of backup control executed at the vehicle-mounted terminal side when the music data is backed up from the vehicle-mounted terminal to the external personal computer in the data management system according to the embodiment of the present invention.

Here, the operation of the program for performing a backup of music data in the vehicle-mounted terminal 1 will be described in detail based on FIG. 7. The backup program, performing backup control as shown in FIG. 7, is stored in the ROM 11 of the vehicle-mounted terminal 1, and is executed by the CPU 3.

First of all, in step S101, the external personal computer 2 is recognized or identified. That is, it is determined whether the external personal computer 2 connected to the vehicle-mounted terminal 1 through the USB control section 18 is a data management device capable of backing up music data with copyright protection. Specifically, the external personal computer 2 is identified according to a predetermined reference such as whether a backup application activated in the external personal computer 2 is compatible with copyright protection, or the external personal computer 2 is equipped with some kind of identification data compatible with the above-mentioned general standard for copyright protection, or the like. When the processing in step S101 is terminated, the control flow goes to step S102.

In step S102, as stated above, copyright compatible management data is started to be formed in the region R5 from the original management data recorded in the region R4 of the HDD 12 in the vehicle-mounted terminal 1. When the processing in step S102 is terminated, the control flow goes to step S103.

In step S103, it is determined whether a music data reproduction application installed on the external personal computer 2 is compatible with the original functions. That is, it is determined whether music data having been backed up under the protection of copyright thereof can be reproduced by the music data reproduction application with the original functions of the vehicle-mounted terminal 1 being added thereto. When it is determined that the music data reproduction application is compatible with the original functions, the control flow advances to step S104 whereas when determined otherwise, the control flow advances to step S106.

In step S104, the above-mentioned main portion and the above-mentioned attached portion of the copyright compatible management data are formed in the region R5 of the HDD 12 from the original management data based on the second reference, as shown in FIG. 6B. When the processing in step S104 is terminated, the control flow goes to step S105.

In step S105, the copyright compatible management data and the music data are transferred to the recording device of the external personal computer 2 under the protection of copyright thereof based on the copyright compatible management data formed in step S104. In addition, the music data reproduction application compatible with the original functions of the vehicle-mounted terminal 1 is installed on the external personal computer 2, so the CPU 3 also transfers the original function data recorded in the region R4 of the HDD 12 to the recording device of the external personal computer 2. After the processing of step S105, this control is terminated.

On the other hand, in step S106, only the above-mentioned main portion of the copyright compatible management data is formed from the original management data based on the second reference, as shown in FIG. 6B. In this connection, note that the reason for not forming the attached portion is that any music data reproduction application compatible with the original functions of the vehicle-mounted terminal 1 is not installed on the external personal computer 2, so the data compatible with the original functions is unnecessary. When the processing in step S106 is terminated, the control flow proceeds to step S107.

In step S107, the copyright compatible management data and the music data are transferred to the recording device of the external personal computer 2 under the protection of copyright thereof based on the copyright compatible management data formed in step S106. Here, any music data reproduction application compatible with the original functions of the vehicle-mounted terminal 1 is not installed on the external personal computer 2, so unlike in step S105, the CPU 3 does not transfer the original function data recorded in the region R4 of the HDD 12 to the recording device of the external personal computer 2. After the processing of step S107, this control is terminated.

According to this control, in the vehicle-mounted terminal 1, at least the main portion of the copyright compatible management data is formed upon the backup of the music data to the external personal computer 2, based on which the backup of the music data is managed. Thus, the backup of the music data is carried out according to the general standard of copyright protection. In addition, when the external personal computer 2 has a reproduction application compatible with the original functions of the vehicle-mounted terminal 1, the music data can be reproduced with the original functions given to the backed up music data. In other words, in the vehicle-mounted terminal 1, there are employed double standards for the management data capable of reproducing the music data with the original functions added thereto, and the management data capable of providing the copyright protection of the general standard, whereby it becomes possible for both of the management data to coexist with each other and for the original functions to be added to the backed up music data.

Second Embodiment

Figure 8:
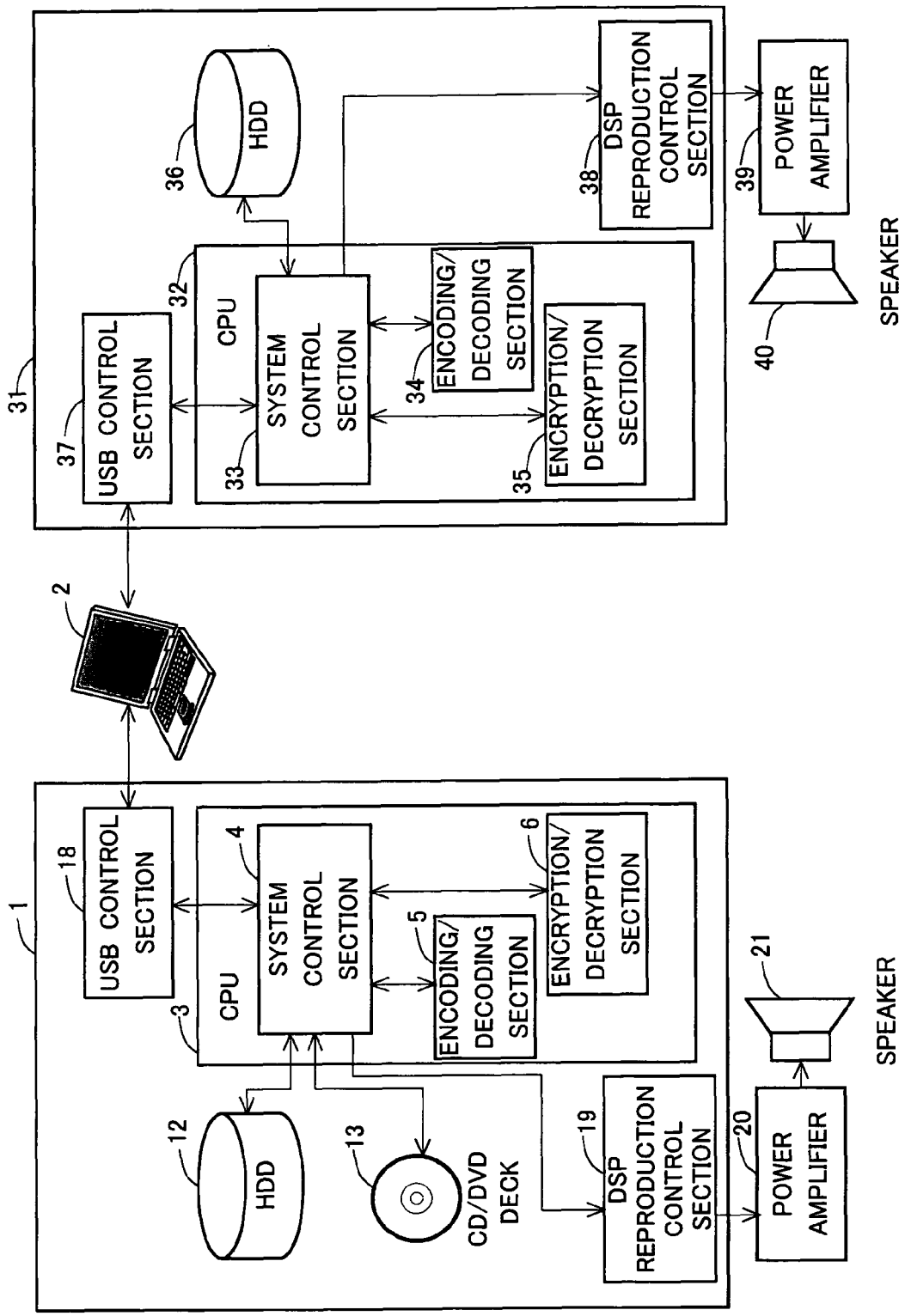
FIG. 8 is the second schematic view of a data management apparatus in the form of a vehicle-mounted terminal and a data management system that is constructed to include the vehicle-mounted terminal according to the embodiment of the present invention.

FIG. 8 shows the outline of a data management apparatus and a data management system according to a second embodiment of the present invention. Here, note that the same reference numerals as those employed in the above-mentioned first embodiment are attached to the same component elements as those which constitute the data management apparatus and the data management system according to the first embodiment, while omitting a detailed description thereof.

The data management system shown in FIG. 8 includes a vehicle-mounted terminal 31 that functions as a third data management device. This vehicle-mounted terminal 31 includes component elements which exert substantially the same function as that of the vehicle-mounted terminal 1. For example, corresponding to the CPU 3, the system control section 4, the encoding/decoding section 5, the encryption/decryption section 6, the HDD 12, the USB control section 18 and the DSP reproduction control section 19 of the vehicle-mounted terminal 1, the vehicle-mounted terminal 31 includes a CPU 32, a system control section 33, an encoding/decoding section 34, an encryption/decryption section 35, an HDD 36, the USB control section 37 and a DSP reproduction control section 38. Also, corresponding to the power amplifier 20 and the speaker 21 which are arranged outside the vehicle-mounted terminal 1, there are arranged a power amplifier 39 and a speaker 40 outside of the vehicle-mounted terminal 31. With such correspondence in arrangement, a detailed description of the component elements of the vehicle-mounted terminal 31 is omitted.

The vehicle-mounted terminal 31 has management data for managing music data based on the first reference, as in the vehicle-mounted terminal 1. Accordingly, in the vehicle-mounted terminal 31, the music data can be reproduced with the same original functions as those of the vehicle-mounted terminal 1 being added to the music data recorded in the HDD 36.

In the data management system constructed in this manner, the vehicle-mounted terminal 31 and the external personal computer 2 are connected to each other through communication, so that the music data backed up in the external personal computer 2 can be moved or copied to the vehicle-mounted terminal 31 through such connection. Hereinafter, a detailed explanation thereof will be given.

The backup of the music data from the vehicle-mounted terminal 1 to the external personal computer 2 is carried out as described in the first embodiment. On the other hand, the moving and copying of the music data from the external personal computer 2 to the vehicle-mounted terminal 31 are carried out based on the copyright compatible management data which are possessed in the recording device of the external personal computer 2. By doing so, the moving and copying of the music data are possible according to the general standard for copyright protection, as in the case of backing up the music data from the vehicle-mounted terminal 1 to the external personal computer 2.

Original management data for the vehicle-mounted terminal 31 is formed, based on the first reference, from the copyright compatible management data that is possessed by the external personal computer 2 at this time, and is recorded into the HDD 36. That is, the new original management data for the vehicle-mounted terminal 31 is formed by performing a conversion reverse to the conversion from the above-mentioned original management data into the copyright compatible management data. Here, the HDD 36 is divided into an accessible region which can be accessed by the external personal computer 2 and an inaccessible region which can not be accessed by the external personal computer 2, so that the new original management data is once copied into the accessible region, and is then moved from the accessible region to the inaccessible region in the vehicle-mounted terminal 31. Also, when the original function data is backed up to the external personal computer 2, it is similarly moved to the inaccessible region once via the accessible region. In addition, the music data itself is moved or copied to the accessible region of the HDD 36.

As a result, the music data accumulated in the vehicle-mounted terminal 1 can be used even by the vehicle-mounted terminal 31. At this time, the copyright of the music data can be protected in a reliable manner due to the existence of copyright compatible management data, and at the same time, the original functions common in the vehicle-mounted terminals 1, 31 can be given to the copied or moved music data even in the vehicle-mounted terminal 31 due to the existence of the attached portion of the copyright compatible management data. As a result, when the vehicle-mounted terminal 1 fails, or when the vehicle-mounted terminal 1 is to be replaced by a new vehicle-mounted terminal 31, the music data accumulated in the vehicle-mounted terminal 1 can be effectively used without violating the copyright thereof.

Here, FIGS. 9A and 9B show the structures of the individual pieces of management data when the music data is moved and copied, respectively, from the external personal computer 2 to the vehicle-mounted terminal 31, wherein FIG. 9A shows the copyright compatible management data that is possessed by the external personal computer 2, and FIG. 9B shows the original management data that is possessed by the vehicle-mounted terminal 31.

Here, in the external personal computer 2, two pieces of music data have been added to the music data backed up from the vehicle-mounted terminal 1. As can be seen from the copyright compatible management data shown in FIG. 9A, too, data related to two musical compositions ID6, ID7 of music data is added to the copyright compatible management data by means of an application in the external personal computer 2. In this connection, note that for the two musical compositions thus added, data compatible with the original functions of the vehicle-mounted terminal is not added.

When the music data is moved or copied to the vehicle-mounted terminal 31, the copyright compatible management data shown in FIG. 9A is converted into the original management data shown in FIG. 9B based on the first reference. That is, the data related to two pieces of copyright compatible data 1, 2 in the main portion of the copyright compatible management data is deleted, and original management data for the vehicle-mounted terminal 31 is formed by the addition of data related to the original functions 1, 2 in the attached portion. Here, note that the data related to the original functions of two pieces of music data ID6, ID7, though blank immediately after the formation of the original management data for the vehicle-mounted terminal 31, may thereafter be added in the vehicle-mounted terminal 31.

Thus, compatibity exists between the first management data and the second management data. That is, either one piece of management data can be formed from the other piece of management data. Accordingly, when either of the pieces of management data is damaged by user's wrong operation, etc., and is put into an abnormal state, the CPU 3 may detects such a state in an automatic manner, or detects a command from the user through the operation section 8, whereby the damaged management data can be restored based on the other normal management data.

While the invention has been described in terms of preferred embodiments, those skilled in the art will recognize that the invention can be practiced with modifications within the spirit and scope of the appended claims.

What is claimed is:

1. A data management apparatus comprising:
a recording device that records contents data; and
a data processing section that processes said contents data;
wherein said recording device records therein first management data for managing said contents data according to a first reference that is a reference for exhibiting optional functions so as to enhance user's convenience upon reproduction of said contents data; and
said data processing section reproduces said contents data based on said first management data, and transfers said contents data to an external device as backup data based on second management data which is used for management of said contents data by said external device according to a second reference that is a reference to have said contents data conform to a standard of a copyright protection for said contents data, wherein
said second management data is composed of a main portion and an attached portion;
said main portion has a main management data for transfer of said contents data to said external device;
said attached portion has a data that does not constitute the main portion of said second management data, among said first management data, based on a difference between said second reference and said first reference; and
said data processing section transfers said contents data to said external device based on said main portion of said second management data.

2. The data management apparatus as set forth in claim 1, further comprising a management data forming section that forms said second management data from said first management data based on said second reference.

3. The data management apparatus as set forth in claim 2, wherein said management data forming section forms said second management data from said first management data immediately before said data processing section transfers said contents data to said external device.

4. The data management apparatus as set forth in claim 1, wherein
said first management data is recorded in an inaccessible region, among the recording area of said recording device, which said external device can not access; and
said second management data and said contents data are recorded in an accessible region, among the recording area of said recording device, which said external device can access.

5. A data management apparatus comprising:
a recording device that records contents data; and
a data processing section that processes said contents data;
wherein said recording device records therein first management data for managing said contents data according to a first reference that is a reference for exhibiting optional functions so as to enhance user's convenience upon reproduction of said contents data;
said data processing section reproduces said contents data based on said first management data, and transfers said contents data to an external device as backup data based on second management data which is used for management of said contents data by said external device according to a second reference that is a reference to have said contents data conform to a standard of a copyright protection for said contents data;
a determination section that determines whether said first management data or said second management data is in a normal state; and
a restoration section that restores abnormal management data from normal management data when said determination section makes a determination that either said first management data or said second management data is not in a normal state, wherein
said second management data is formed from said first management data based on said second reference, and/or said first management data is formed from said second management data based on said first reference.

6. A data management system comprising:
a first data management device including a first recording device that records contents data, and a first processing section that processes said contents data based on first management data; and
a second data management device that can communicate with said first data management device and includes a second recording device that can record predetermined data and a second processing section that processes said contents data based on second management data;
wherein said first management data is data for managing said contents data according to a first reference that is a reference for exhibiting optional functions so as to enhance user's convenience upon reproduction of said contents data, and said second management data is data for managing said contents data according to a second reference that is a reference to have said contents data conform to a standard of a copyright protection for said contents data;
said first processing section reproduces said contents data based on said first management data in said first data management device; and
said second processing section transfers said contents data to said second recording device as backup data based on said second management data, wherein
said second processing section transfers said second management data to said second recording device together with said contents data, and when contents data recorded in said second recording device is updated further, the second processing section also updates said second management data recorded in said second recording device in accordance with the update of said contents data therein.

7. The data management system as set forth in claim 6, wherein
said second management data is formed from said first management data based on said second reference, and/or said first management data is formed from said second management data based on said first reference.

8. The data management system as set forth in claim 6, wherein
said first management data is recorded in an inaccessible region, among a recording area of said first recording device, which said second data management device can not access; and
said second management data and said contents data are recorded in an accessible region, among the recording area of said first recording device, which said second data management device can access.

9. The data management system as set forth in claim 7, wherein
said first data management device further comprises: a determination section that determines whether said second management data is in a normal state, and a restoration section that restores new second management data from said first management data based on said second reference when said determination section makes a determination that said second management data is not in a normal state.

10. The data management system as set forth in claim 6, further comprising:
a management data forming section that forms said second management data from said first management data based on said second reference, and records it in said first recording device immediately before said second processing section transfers said contents data to said second recording device.

11. The data management system as set forth in claim 6, further comprising:
a management data forming section that forms said second management data from said first management data based on said second reference, and records it in said first recording device when said second data management device communicates with said first data management device.

12. The data management system as set forth in claim 6, wherein
said second management data is composed of a main portion and an attached portion, and said main portion has a main management data for transfer of said contents data to said second data management device, and said attached portion has a data that does not constitute said second management data, among said first management data, based on the difference between said second reference and said first reference, whereby said second processing section transfers said contents data to said second recording device based on said main portion of said second management data.

13. The data management system as set forth in claim 12, further comprising:
a third data management device that can communicate with said second data management device and includes a third recording device that can record predetermined data and a third processing section that processes said contents data recorded in said second recording device according to third management data;

wherein said second processing section transfers said second management data to said second recording device together with said contents data; and said third processing section forms said third management data in said third recording device from said main portion and said attached portion of said second management data recorded in said second recording device based on said first reference, and transfers said contents data recorded in said second recording device to said third recording device based on said third management data.

* * * * *